United States Patent
Chen et al.

(10) Patent No.: US 11,170,342 B1
(45) Date of Patent: Nov. 9, 2021

(54) ITEM IDENTIFICATION AND GUIDANCE SYSTEM AND METHOD

(71) Applicant: Amazon Technologies, Inc., Reno, NV (US)

(72) Inventors: Zhongkai Matt Chen, Sammamish, WA (US); John Lewis Colucci, Bellevue, WA (US); Claudia Duenas Bayardi, Lopez Mateos (MX)

(73) Assignee: AMAZON TECHNOLOGIES, INC., Seattle, WA (US)

(*) Notice: Subject to any disclaimer, the term of this patent is extended or adjusted under 35 U.S.C. 154(b) by 119 days.

(21) Appl. No.: 16/450,315

(22) Filed: Jun. 24, 2019

(51) Int. Cl.
*G06Q 10/08* (2012.01)

(52) U.S. Cl.
CPC ..... *G06Q 10/0875* (2013.01); *G06Q 10/0838* (2013.01)

(58) Field of Classification Search
CPC .................. G06Q 10/0875; G06Q 10/0838
USPC .......................................................... 705/29
See application file for complete search history.

(56) References Cited

U.S. PATENT DOCUMENTS

| 2018/0096299 A1* | 4/2018 | Jarvis ................... G05D 1/0274 |
| 2019/0287063 A1* | 9/2019 | Skaaksrud ........... G05D 1/0011 |

* cited by examiner

*Primary Examiner* — Garcia Ade
(74) *Attorney, Agent, or Firm* — Hogan Lovells US LLP

(57) ABSTRACT

A storage controller provides a visual indication of a physical location of an item arranged at a temporary storage location in a logistics center. The storage controller receives the item and associates the item with the particular temporary storage location. When a controller determines that the item is needed for an upcoming shipment, a signal is transmitted to the storage controller to active an indicator. Operations personnel may quickly identify the indicator to retrieve the item. Once the item is retrieved, it may be scanned to deactivate the indicator.

20 Claims, 14 Drawing Sheets

ITEM IDENTIFICATION AND GUIDANCE SYSTEM AND METHOD

BACKGROUND

Logistics operations, such as local or global shipping, may be performed at facilities arranged at locations proximate to high-consumer concentration areas, such as near major cities or close to major shipping methods (e.g., highways, airports, etc.). While various tasks within the facilities may be automated, human operators may still perform tasks throughout the facility. One such task is identification and attainment of various high-priority packages. At various times, critical pull times may be associated with obtaining a package or group of packages, which may be a subset of packages managed by the facilities, to be collected before a shipment time. It may be difficult to identify these items due to the large scale of the facilities, as well as the method used to pick or otherwise obtain items stored at the facility. When these items are missed, customers may not receive them within a promised period of time.

BRIEF DESCRIPTION OF THE DRAWINGS

Various embodiments in accordance with the present disclosure will be described with reference to the drawings, in which.

DETAILED DESCRIPTION

Figure 1:
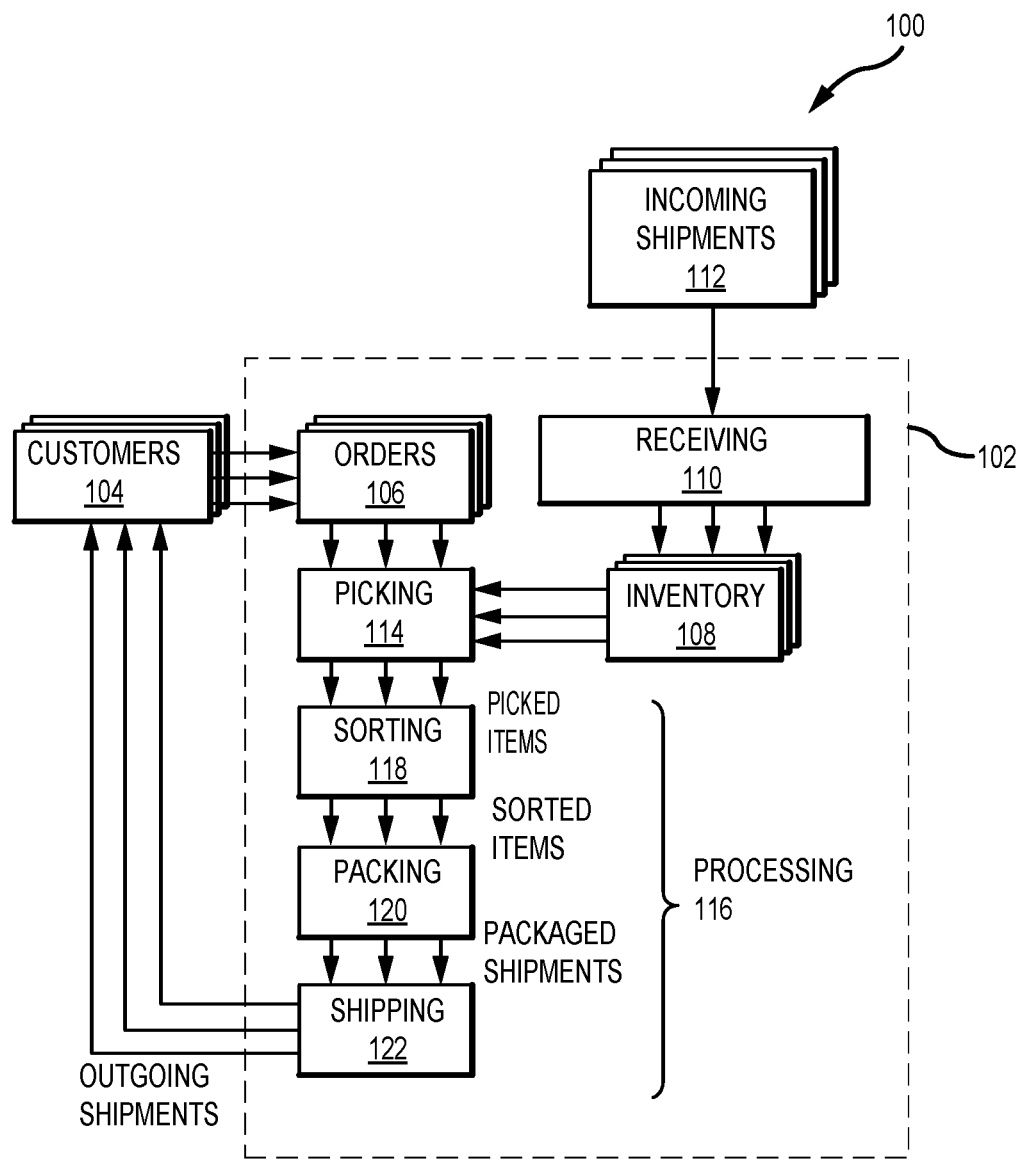
FIG. 1 illustrates an example environment of a logistics center in which aspects of the various embodiments can be utilized.

Systems and methods in accordance with various embodiments of the present disclosure overcome one or more of the above-referenced and other deficiencies in conventional approaches to identifying and obtaining high-priority items, which may be packages for shipment, within a logistics center (e.g., fulfillment center, distribution center). In particular, various embodiments provide a solution to problems associated with identifying items within the logistics center after the item has been picked (e.g., selected from inventory). In various embodiments, systems and methods may provide an identification system to quickly enable operations personnel, which may be a human operator or an automated operator, to identify a location where the picked item is stored. The quick identification may enable items having a high-priority to be rapidly identified and obtained prior to a critical time, such as an outgoing shipment. Accordingly, in various embodiments, a likelihood that shipments are missed and/or items are delivered late to customers may be reduced.

In various embodiments, customer orders may be transmitted to a logistics center, where the items are picked from available inventory (or incoming inventory) and staged within the logistics center. Picking may include arranging the items on and/or within sortable or non-sortable containers or carriers. For example, the sortable containers may be referred to as carts, which may be moveable. By way of example, the non-sortable containers may be stationary and may include a walled or partially walled structure. These items may be scanned such that an identification number, such as an Amazon Standard Identification Number (ASIN), is associated with a particular sortable or non-sortable container, which may be referred to as a temporary storage location. Often, certain items may be expedited, such as items that receive priority shipping or the like. Accordingly, in embodiments, operations personnel may pull items from the temporary storage location for expedited packing and shipping. However, logistics centers may be large, and there may be hundreds of temporary storage locations arranged throughout the logistics center. These temporary storage locations may be identifiable by a physical label, which may be difficult to read from a distance or difficult to see when several temporary storage locations are arranged close to one another. Accordingly, it may be challenging for operations personnel to locate the items before a critical time, such as a time when the items are scheduled to go out for shipment.

In various embodiments, the temporary storage locations may be equipped with an identification system to provide an indication, such as a visual indicator, auditory indicator, etc., to alert and guide operations personnel toward the appropriate temporary storage location for a given item. For example, the item may be associated with the temporary storage location, for example via the ASIN, and within a predetermined period of the critical time the identification system may transmit an alert to guide the operations toward the temporary storage location. In certain embodiments, the temporary storage location may further include particularized indicators for individual storage locations within the temporary storage location. In this manner, operations personnel may quickly identify the appropriate temporary storage location to obtain the item prior to the critical time.

In certain embodiments, items may be requested within a threshold period of time before the critical time. For example, shipments may go out in intervals (e.g., every hour) and items may be identified a certain number of shipments before a scheduled shipment. This may be deemed an urgency, where items associated with a next shipment may have a higher urgency than items associated with a later shipment. In embodiments, the identification system may further provide urgency along with the identification. Accordingly, operations personnel may prioritize selection to the most urgent items.

Embodiments of the present disclosure may utilize one or more electronic communications protocols to facilitate tracking of items with various temporary storage locations. In certain embodiments, the temporary storage locations may utilize a communications system that is different than other systems used within the logistics center, thereby reducing the likelihood of interference. For example, the temporary storage locations may use a system that communicates with a 900 MHz wireless system. The system may utilize a number of different network topologies. While the 900 MHz system may be described here, it should be appreciated that various RF communication systems may be utilized.

FIG. 1 is a schematic block diagram of a logical representation of operation of an order fulfillment operation 100 which includes a logistics center 102, which may also be referred to as a fulfillment center or distribution center. In embodiments, the fulfillment center may fill orders received from customers 104. For example, the customers 104 may submit orders 106, for example through an online marketplace, and these orders 106 are transmitted to the fulfillment center 102. The orders 106 may specify one or more products for delivery to the customers 104. The products in the illustrated embodiment are selected from inventory 108 (e.g., stock storage). It should be appreciated that the logistics center 102 may store the inventory 108 on site, or may receive inventory via an associated receiving center 110. The receiving center 110 may receive incoming shipments 112. These incoming shipments 112 may be provided "on demand" or may be requested when the order 106 is received. As a result, the logistics center 102 may only store a limited amount of items in inventory 108, such as popular items for a region in which the logistics center 102 is located. However, it should be appreciated that the inventory 108 may also include any number of items and the goal of the inventory 108 may be to include a diverse selection of products to enable rapid fulfillment of customer orders 106.

In various embodiments, the orders 106 may be scanned and then picked via a number of different processes. For example, a picking process 114 may include providing information to an automated picking system that selects items that may be stored at various locations within the inventory 108. Furthermore, in embodiments, human personnel may manually pick the orders. It should be appreciated that the picking process 114 may also include prioritized or rapid selection of items to enable fulfillment of orders within a predetermined time period. The picked items from the inventory 108 may undergo processing 116, which may include a number of different steps. For example, processing 116 may include sorting 118, packing 120, and shipping 122.

In various embodiments, the sorting process 118 may utilize manual and automated systems, such as conveyor systems and the like. The conveyor systems may receive the picked items and deliver the picked items to different sections of the logistics center 102. The items may be arranged on the conveyor systems, such as on a conveyor belt, and then distributed to other portions of the system, such as a flat sorter, tilt sorter, and the like (e.g., sorting conveyors). Along the process, the items may be scanned and then directed toward the packing area. In embodiments, the sorting conveyors may transport the items to a designated area and then remove the items from the sorting conveyors. In various embodiments, the sorting conveyors include particular conveyance receptacles that receive one or more items. The conveyance receptacles may then be routed to particular destinations for the items contained within the receptacles in accordance with the orders 106 currently being processed (e.g., to sorting stations, under direction of a control system). For example, with the flat sorter a floor or portion of the floor of the conveyor belt may open to enable the items to fall through toward the packing area. In another example, the tilt sorters may reach a designated area and then tilt a portion to direct the item toward the packing area or another area. It should be appreciated that, in various embodiments, a picked, packed and shipped order does not necessarily include all of the items ordered by the customer and an outgoing shipment to a customer may include only a subset of the ordered items available to ship at one time from one inventory-storing location. In some other embodiments, picked items may be delivered to particular destinations via other means, such as automated guided vehicles, pallet jacks, and the like.

As noted above, in various embodiments, temporary storage locations may be utilized after picking items such that certain items are arranged throughout the facilitate in and/or on associated sortable or non-sortable containers, such as carts. These temporary storage locations may be utilized prior to the sorting and/or packing processes described above. However, in embodiments, various restrictions, such as time restrictions, may prevent certain items from going through the traditional sorting and packing processes. Accordingly, operations personnel (e.g., human operators or automated operators) may identify and select certain items for prioritized processing, such as expedited packing and shipping. Because there may be thousands or millions of items within the logistics center, which may be very large, it may be difficult to identify the temporary storage location of a given item. Embodiments of the present disclosure include an identification system to provide an indicator to the operations personnel to find and obtain the items associated with expedited processing.

Figure 2:
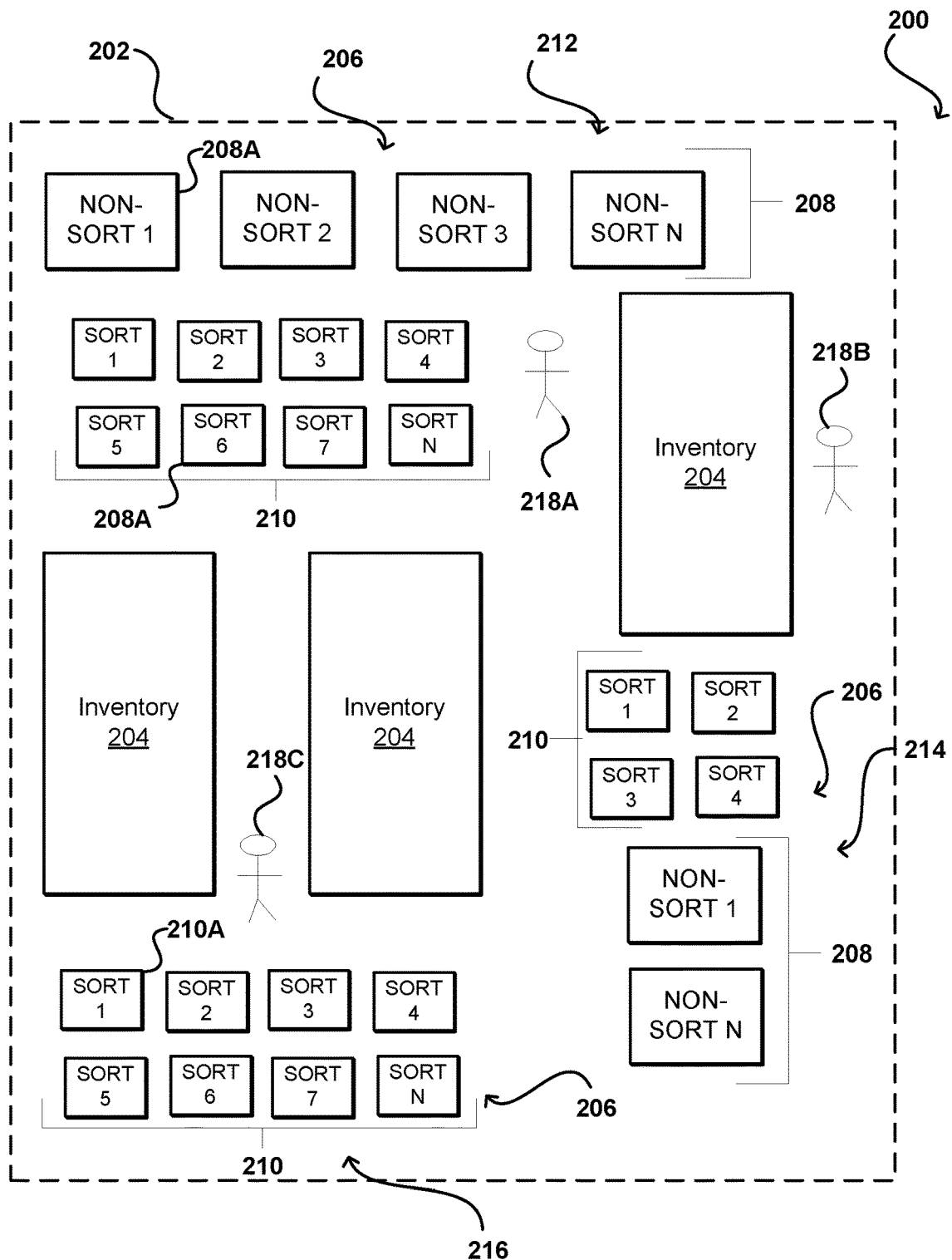
FIG. 2 illustrates an example layout of a logistics center in which aspects of the various embodiments can be utilized.

FIG. 2 is schematic view of an example layout 200 of a logistics center 202. As described above, the logistics center 202 may be utilized to send and receive shipments to fulfill customer orders. In various embodiments, the logistics center 202 keeps inventory 204, which may organize or otherwise store items that may be associated with the customer orders. When an order is received, the items that form the order may be picked from the inventory 204 and arranged within temporary storage locations 206. As noted above, in various embodiments, the temporary storage locations 206 may include non-sortable containers 208 (e.g., walled containers, semi-walled containers) non-sortable containers 208, which may be stationary and utilized for large items. Additionally, the temporary storage locations 206 may also include sortable containers 210 (e.g., carts), which may be mobile. In various embodiments, sortable 210 and non-sortable containers 208 may be differentiated by the items they are intended to store. For example, in various embodiments, non-sortable containers 208 are utilized for large items, which may have a size or weight above a certain threshold. By way of example, the size may be approximately 18 inches along one dimension and the weight may be approximately 5 pounds. The thresholds may be determined, at least in part, based on material handling equipment within the facility. The non-sortable containers 208 may be transported through the logistics center 202, utilizing a transportation tool such as a forklift or the like, to select the lager items from inventory for storage within the non-sortable container 208. The non-sortable container 208 may then be deposited at a desired location when full or based on another trigger event, such as filling an order. In contrast, the sortable containers 210 may be movable without equipment, such as a wheeled cart, and may be used for smaller items. In the illustrated embodiment, various non-sortable containers 208 are arranged around the logistics center 202, along with various sortable containers 210. It should be appreciated that the number of non-sortable containers 208 and sortable containers 210 is for illustrative purposes only and that, in various embodiments, there may be hundreds of non-sortable containers 208 and sortable containers 210 positioned at different locations within the logistics center 202. For example, a first area 212 includes the non-sortable containers 208 illustrated as NON-SORT 1-NON-SORT N. As a result, there may be dozens or hundreds of the non-sortable containers 208. Additionally, the first area 212 also includes the sortable containers 210 illustrate as SORT 1-sort n. Similarly, there may be dozens or hundreds of sortable containers 210 in the first area 212. Furthermore, a second area 214 includes both the non-sortable containers 208 and the sortable containers 210, while a third area 216 includes only the sortable containers 210.

In various embodiments, the non-sortable containers 208 and sortable containers 210 are labeled with signage, which may be positioned on the non-sortable containers 208 and sortable containers 210. While the stationary non-sortable containers 208 may enable some logical order (e.g., non-sortable containers that start with 1 are in a certain location and non-sortable containers that start with 2 are in a different location), the sortable containers 210 are mobile and may be moved between the first area 212, the second area 214, and the third area 216 as items are picked from inventory 204. As a result, it may be challenging for operations personnel 218 to locate items associated with particular non-sortable containers 208 and/or sortable containers 210. By way of example, the operations personnel 218A may be assigned a task to locate an item on sortable container 210A. The operations personnel 218A may receive the cart number for sortable container 210A, however, due to the size of the logistics center 202 and the number of items within the logistics center 202, it may be challenging for the operations personnel 218A to locate the item without going through each cart of the first area 212, the second area, 214, and the third area 216, until the sortable container 210A is located. Similarly, if the operations personnel 218B was assigned the sortable container 210B and the operations personnel 218C was assigned the non-sortable container 208A, the same problem arises. That is, it may be challenging to identify the appropriate non-sortable container 208 or sortable container 210 from the many non-sortable containers 208 and sortable containers 210 in the logistics center 202. Embodiments of the present disclosure overcome these problems by providing indicators via an identification system to enable the operations personnel 218 to identify the non-sortable containers 208 and sortable containers 210.

Figure 3:
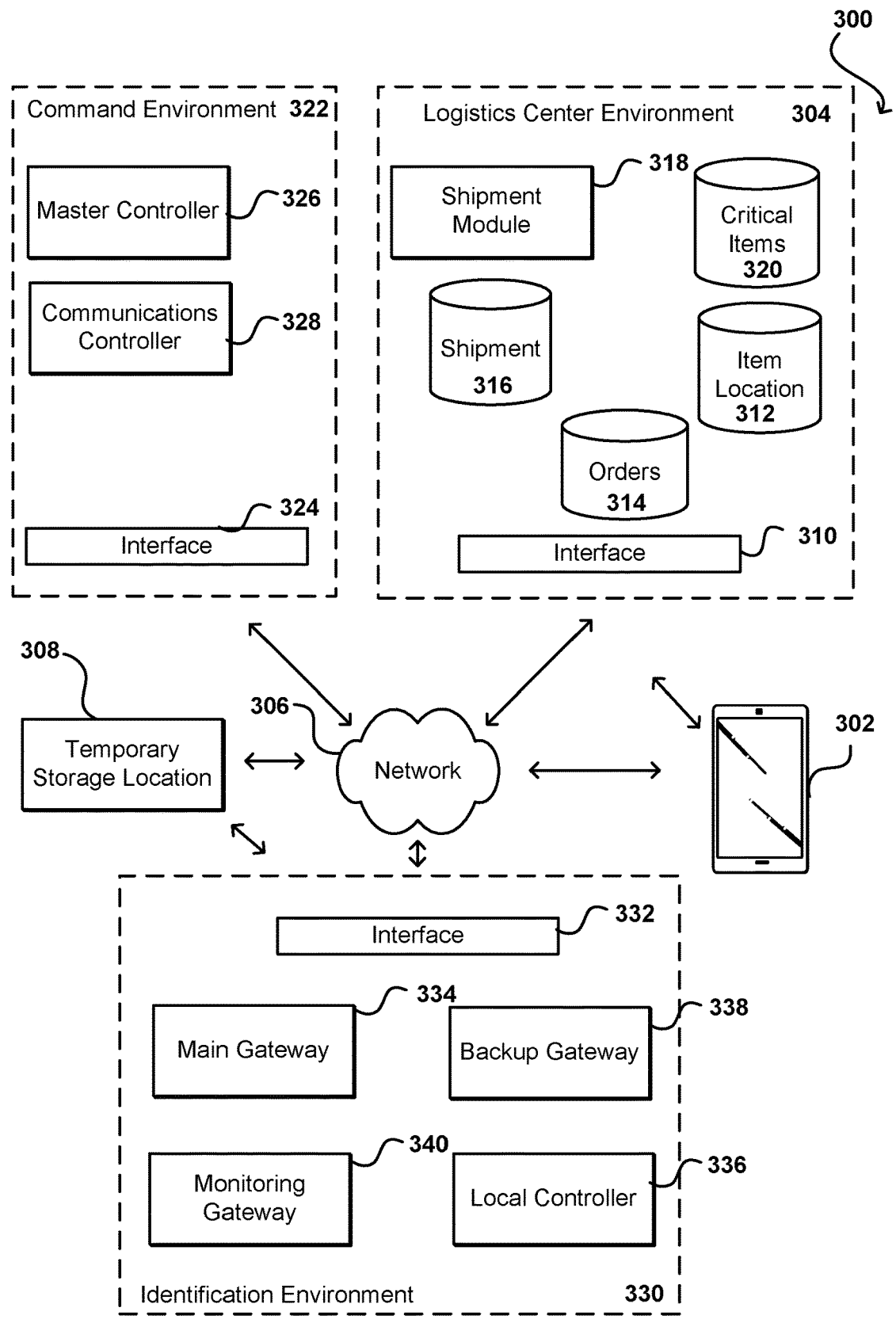
FIG. 3 illustrates an example diagram of a control environment for a logistics center in which aspects of the various embodiments can be utilized.

FIG. 3 is an example identification system 300, in accordance with aspects of the various embodiments of the present disclosure. In this example, a client computing device 302 can submit information to a logistics center environment 304 related to a location of one or more items arranged within the logistics center. It should be appreciated that, in various embodiments, the item is a physical item, located within a physical boundary of the logistics center, and may be obtained within the logistics center for delivery to a customer in response to a customer order. The client computing device may submit the information over a network 306 to be received by the logistics center environment 304. The network(s) can include any appropriate network, such as the internet, a local area network (LAN), a cellular network, an Ethernet, or other such wired and/or wireless network.

The client device 302 may be any appropriate computing or client device, as may include a desktop or notebook computer, smartphone, tablet, wearable computer (i.e., smart watch, glasses, or contacts), set top box, smart TV, or other such system or device. In various embodiments, the client device 302 will be equipped or include functionality to facilitate scanning, such as barcode, QR code, or the like, in order to track and/or monitor items within the logistics center. For example, an item may be scanned, using the client device 302, when the item is arranged at a temporary storage location 308, such as the sortable containers (e.g., carts), non-sortable containers (e.g., walled or semi-walled containers), shelves, and the like. The information, such as a data attributing the item to the temporary storage location 308, may be transmitted to the logistics center environment 304. An interface layer 310, when receiving a request or call, can determine the type of call or request and cause information to be forwarded to the appropriate component or sub-system. For example, information associated with an updated location for an item may be directed to an item location data store 312. The item location data store 312 may store data associated with particular items and their relative location within the logistics center. The data may include information such as a customer order number, which may be retrieved from an orders data store 314, an item number, and a temporary storage location, which as described above, may be associated with a particular non-sortable container, sortable container, or the like.

The logistics center environment 304 further includes a shipment data store 316, which may track and monitor expected ship times for the customer orders, either entirely or for individual items as they are made available. For example, the shipment data store 316 may include a list of certain items, associated with particular orders, and their expected shipment times in order to reach customers by an expected delivery date. Furthermore, the shipment data store 316 may also include logistical information related to shipments arriving to and leaving the logistics center. For example, the shipment data store 316 may track outgoing trucks or the like. In various embodiments, the shipment module 318 may utilize this information to formulate a critical items data store 320. The critical items data store 320 may include lists of items and associated shipments that should include those items. In various embodiments, the critical items are selected based on times of the outgoing shipments. Items that should be included on an outgoing shipment may be listed within the critical items data store 320, for example, in a list that includes all items associated with a particular outgoing shipment. The critical items data store 320 may be continuously updated as outgoing shipments leave the logistics center and new items are designated as being "critical" to ensure the items are located or prepared prior to the departure of their designed outgoing shipment. It should be noted that "critical" is used herein to describe items of high importance with respect to being delivered on time or within a promised time. As a result, any item may become a critical item if it is associated with a soon-to-leave outgoing shipment. Additionally, items may be elevated to being "critical" if they have special handling or expediting instructions, for example.

Information from the logistics center environment 304 may be broadcast, for example via a wireless protocol, and received at a command environment 322. For example, an interface 324 of the command environment 322 may receive the transmission from the logistics center environment 304 for processing by a master controller 326. The master controller 326 may receive and process information regarding the items and their associated carts for upcoming shipments and the like. It should be appreciated that, in various embodiments, the master controller 326 may be associated with the same environment as the shipment module 318, or various other components, but for clarity, each has been illustrated as being separate. The illustrated master controller 326 is utilized to process the information received from the logistics center environment 304 in order to formulate instructions for a communications controller 328. For example, the master controller 326 may determine a certain number of items that are scheduled on an outgoing shipment within a threshold period of time. In various embodiments, the communications controller 328 may be an "Internet of Things" controller that processes and/or receives information from a variety of products and sensors that are coupled to the network 306. The communications controller 328 may transmit information, over the network 306, to an identification environment 330. In various embodiments, communications may be commands to activate one or more objects associated with the temporary storage locations 308.

By way of example only, the master controller 326 may receive the list of critical items and/or information from the shipment module 318, which may include cart to critical pull time (CPT) mappings from the logistics center. As used herein CPT may define a time to obtain and stage an item or package prior to an outgoing shipment. The CPT may, in various embodiments, represent a time before an outgoing shipment that enables a customer to receive an item (assuming normal shipping procedures) within a predetermined period of time. In other words, CPT may represent the list of items and their associated outgoing shipments and times of those shipments. For example, in various embodiments, the CPT may include a list of items associated with an outgoing shipment leaving in approximately 1 hour. In certain logistics centers, which process hundreds or thousands of orders a day, various CPTs may exist throughout the day. Continuing the example, when the next CPT is approaching, logistics center broadcasts the mappings and the master controller 326 subscribes to these broadcasts, ingests them on demand, and immediately sends (for example, via MQTT) commands to a gateway deployed in the logistics center. Once the appropriate temporary storage location has been identified and scanned by the operations personnel, the master controller 326 ingests the scan event and subsequently clears the item and removes the indication associated with the temporary storage location.

The illustrated identification environment 330 includes an identification interface 332 and a main gateway 334. The main gateway 334 may transmit the commands to a local controller 336 that transmits the commands to the temporary storage location 308. In various embodiments, the communication channel utilized to transmit information to the temporary storage location 308 is different from the network 306. For example, communications from the local controller 336 may be at approximately 900 MHz, while other wireless communications may be at 2.4 GHz. In other words, the communications from the local controller may be a sub-GHz network. For example, the sub-GHz band may include approximately 900 MHz, but may also range from approximately 750 MHz to 1 GHz. It should be appreciated that the particular band may be country specific, and as a result the range is an approximation of various different sub-GHz bands. As a result, the likelihood of interference between communications within the logistics center is reduced. Furthermore, in various embodiments, regulations or standards may be in place that restrict or otherwise prevent certain communications protocols from use. However, using the 900 MHz band enables wireless communications on a different band while still utilizing a wireless protocol within the facility. It should be appreciated that, in various embodiments, the local controller 336 may be integrated into the main gateway 334, for example, via one or more wireless modules. By way of example only, a Digi 900HP wireless module may be utilized, but it should be appreciated that a variety of different modules that operate at 900 MHz, as well as other bands, may also be used.

In various embodiments, the main gateway 334 is a device that communicates with a cloud network, such as the command environment 322 or other networks, such as CORP network, and receives control commands of peripheral devices from the master controller 326, and processes and sends commands to storage controllers, which are running on the 900 MHz band. For example, a thin client may be utilized as the main gateway 334 that couples to the local controller 336 via a port or other connection.

The illustrated identification environment 330 also includes a backup gateway 338 and a monitoring gateway 340. In various embodiments, the backup gateway 338 may be eliminated and the monitoring gateway 340 may be integrated into the main gateway 334. In operation, the monitoring gateway may be used for health monitoring of equipment associated with the temporary storage locations 308. For example, the temporary storage locations 308 may include storage controllers, described below, which may receive updates from the monitoring gateway 340 or provide diagnostic information to the monitoring gateway 340. In embodiments, the monitoring gateway 340 may also communicate using the local controller 336 or a separate controller, which may also be over the 900 MHz band. In embodiments, over the air updates, such as firm updates, are performed utilizing the monitoring gateway 340. The monitoring gateway 340 may be remotely accessible, for example via the logistic center environment 304 or the command environment 322, to facilitate remote monitoring and configuration of the controllers of the temporary storage locations 308. As noted above with respect to the backup gateway 338, the monitoring gateway 340 may be standalone or integrated into the main gateway 334.

In various embodiments, as noted above, the monitoring gateway 340 enables remote configuration and health monitoring of the modules inside the storage controllers and can be accessed through an internal HTTP server in the local network or via an external network. In embodiments, the monitoring gateway 340 is configured as a single chip computer. Monitoring may be done remotely via a dashboard or other user interface that serves as a platform for routing alarms and device health, such as battery life monitoring, along with providing maintenance functionality of remote debugging and over-the-air updates without involving any business data.

As described above, it may be challenging to include additional equipment within the logistics center because many of the existing devices used in the logistics center operate on the 2.4 GHz network (e.g., WiFi and Bluetooth). Due to the large number of devices in use, this band is already congested, and as a result, improved connectively and transmission latency may be provided by avoiding the existing network. Accordingly, embodiments of the present disclosure may utilize the 900 MHz band protocol for wireless communication between the main gateway 330 and the storage controllers. Based on the specification of 900HP, the protocol can support a range of 610 meters indoor and 14 kilometers outdoor with full configurability of multiple characteristics, such as transmission power (up to 24 dBm, software selectable), AES encryption, time out of each transmission, number of retries, self-healing mesh network, unicast and broadcast modes, and low power/sleep mode. Accordingly, the advantages of wireless communication between devices are realized by avoiding the drawbacks of attempted operation on a congested network.

Figure 4:
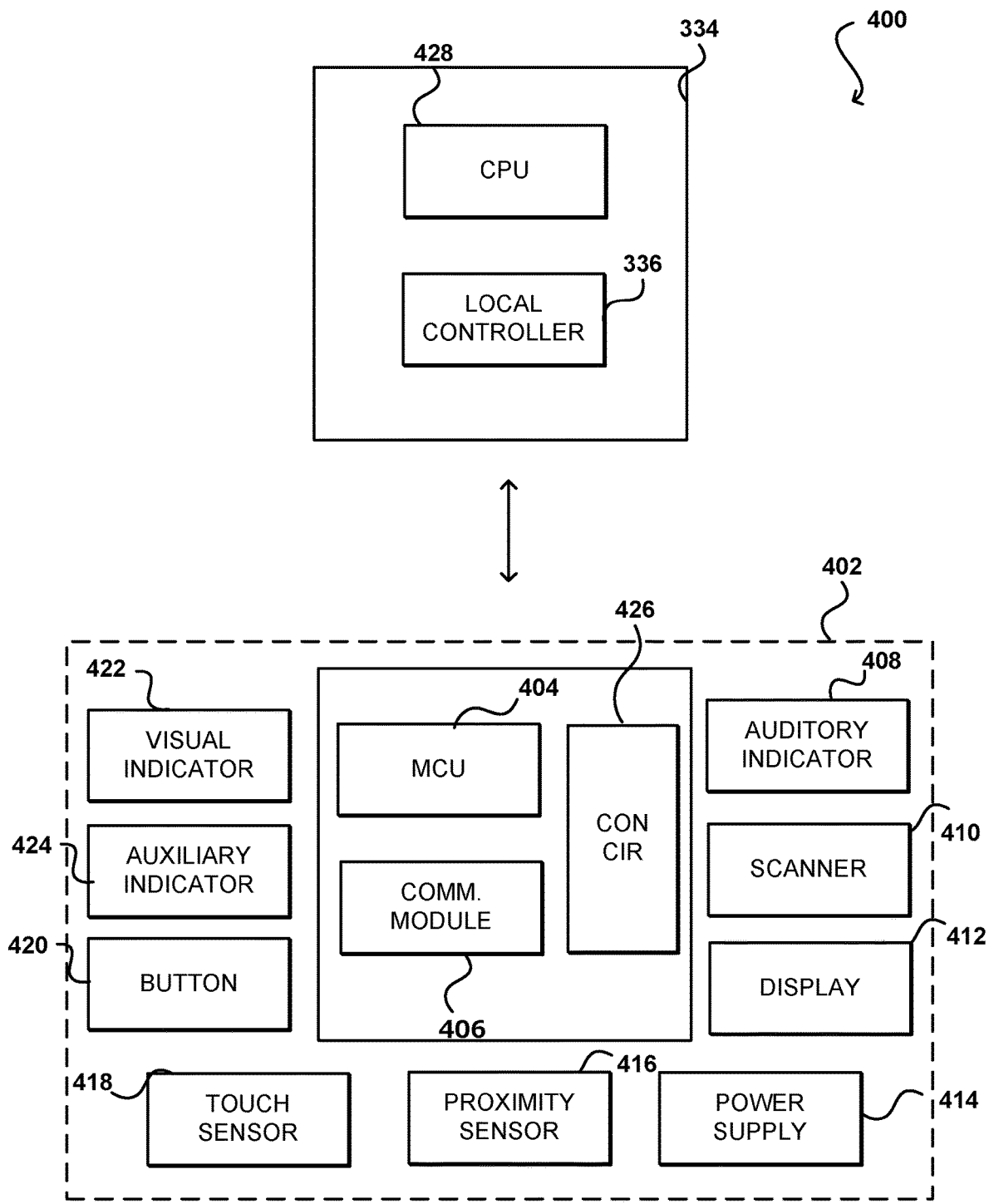
FIG. 4 illustrates an example diagram of a location and notification system in which aspects of the various embodiments can be utilized.

FIG. 4 is an example location and notification system 400, in which aspects of the various embodiments can be implemented. In various embodiments, a storage controller 402 is arranged at the temporary storage location. For example, the storage controller 402 may include a modular housing having one or more associated components that may be mounted at and/or to the temporary storage location. In various embodiments, for example, the non-sortable container may include the storage controller 402, the sortable container, such as the cart, may include the storage controller 402, and the sortable container, such as the shelf, may include the storage controller 402. Each storage controller 402 may be individually tuned and paired to a particular temporary storage location. As a result, items associated with a temporary storage location, such as via scanning when the items are picked, may be associated with the particular storage controller 402, via the association with the temporary storage location. In other words, the storage controller 402 may be particularly assigned to a temporary storage location.

The illustrated storage controller 402 may be arranged within a housing that enables mounting to the temporary storage location. It should be appreciated that various components may be arranged within the housing, which may be partially within the housing or wholly within the housing. Furthermore, components may be communicatively coupled to components arranged within the housing and/or partially within the housing. The illustrated storage controller 402 includes a microcontroller (MCU) 404 to drive its peripheral devices. By way of example only, the MCU may include an ARDUINO® product, such as a Nano including an IO Shield. However, it should be appreciated that various microcontrollers may be utilized, such as custom printed or designed printed circuit boards. In various embodiments, a storage communications module 406 is included, which may be similar to the local controller 336 in that the storage communications module 406 may send and receive transmissions over the 900 MHz band. In various embodiments, the IO Shield interfaces with the storage communications module 406. Various other components of the storage controller 402 may include an auditory indicator 408, a scanner 410, a display 412, a power supply 414, a proximity sensor 416, a touch sensor 418, a button 420, a visual indicator 422, an auxiliary indicator 424, and a control circuit 426. It should be appreciated that the auxiliary indicator 424 may provide indications in a variety of forms, such as auditory, visual, haptic, and the like. Furthermore, in embodiments, it should be appreciated that one or both of the visual indicator 422 and/or the auxiliary indicator 424 may be integrated into a display, such as the display 412, to provide information, such as a message to operations personnel.

In various embodiments, the control circuit 426 may be utilized to control operation of the first indictor 422 and/or the auxiliary indicator 424, which in certain embodiments include visual indicators such as lights. In embodiments, the lights are LED lights. The lights may illuminate differently, for example, based on a context of the command received. For example, the lights may blink, in order to obtain the attention of operations personnel searching for the lights. Furthermore, in embodiments, the lights may have different color indications, which may provide different information to the operations personnel. For example, in embodiments where the next 3 CPT sets of items are transmitted, temporary storage locations associated with the most recent CPT may be red, while the next most recent may be yellow, while the last may be green. Furthermore, different combinations of lights may be illuminated. In certain embodiments, the LED lights are configured as a whip antenna, operating at the 900 MHz band, wrapped with a strip of 20 pixels. However, more or fewer may be included. The storage controller 402 with the LED whip antenna may then be attached on the top side of a sortable or non-sortable container for visibility and signal reception.

It should be appreciated that various different components may be utilized to form aspects of the storage controller 402. For example, in various embodiments the auditory indicator 408 may include a buzzer, which may be a device to generate sounds in response to a command received from the MCU 404. The scanner 410, for example, may include an optical scanner that captures and decodes 2D/QR Bar codes. The display 412 in various embodiments, may be an E-Ink display operating with lower power consumption. In certain embodiments, E-Ink displays can last for several months without power after being refreshed. The display 412 may be utilized to provide various pieces of information. For example, the display 412 may identify the particular object on the sortable container and/or within the non-sortable container associated with the CPT. Furthermore, in embodiments, the display 412 may relay additional instructions or the like. The power supply 414 may include a universal 5V USB power bank. By way of example only, the power supply 414 may support a 2.1A output and with 10,000 mAh capacity. It should be appreciated that other power banks with more capacity (e.g. 25,000 mAh) are available and, in various embodiments, include capability of being charged by solar for longer battery life and outdoor usage. In various embodiments, logistics centers 202 may include hundreds of different temporary storage locations, and as a result, it may be undesirable to charge the power supplies often. Accordingly, components of the storage controller 402 may operate in a standby mode. As a result, power consumption of various components may be optimized. For example, power consumption of LEDs can be reduced by lowering brightness as well as changing the blink pattern duty cycle. In addition, components that are not in service may be in sleep mode until a notification is received. Additionally, delays and the like may further increase time intervals between power supply recharges. For example, a 60-second delay from a blink command being sent until LEDs start blinking enables the communication module 406 to wake up just 1 second every 60 seconds, which may improve battery life.

Embodiments of the present disclosure may also include the proximity sensor 416 that detects obstacles and generates logical signals when any obstacle is in range. Furthermore, the touch sensor 418 may be a capacity touch sensor that functions similarly to a button but without any mechanical components. The button 420 may include a 2-wire button, or the like, that converts a physical input into a signal.

In various embodiments, the location and notification system 400 may utilize the storage controller 402, which may be mounted at temporary storage locations, to receive information from the main gateway 334, which as noted above may include a CPU 428 and local controller 336 to transmit information, such as over the 900 MHz band. Accordingly, in operation, instructions may be transmitted from the main gateway 334, which may cause the first or second indicators 422, 424, or other components, to provide a notification indicative of a storage location for an item associated with a CPT.

Figure 5:
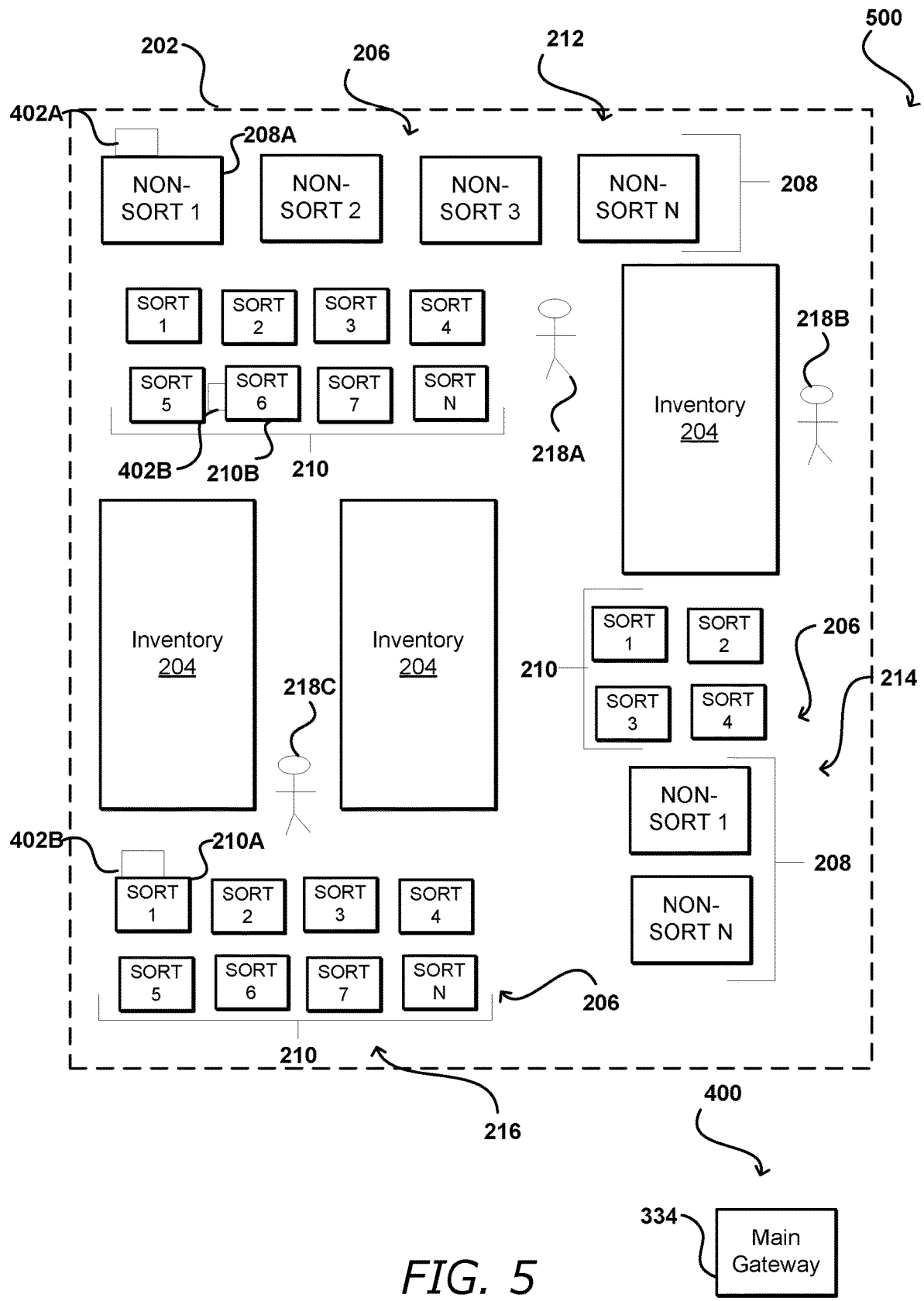
FIG. 5 illustrates an example layout of a logistics center in which aspects of the various embodiments can be utilized.

FIG. 5 is a schematic view of an example layout 500 of the logistics center 202 incorporating the location and notification system 400. As described above with respect to FIG. 2, the logistics center 202 may include the temporary storage locations 206, such as the non-sortable containers 208 and the sortable containers 210. In operation, a list of items associated with various different CPTs may be provided. For example, items associated with sortable container 210A, sortable container 210B, and non-sortable container 208A may be identified being part of an upcoming outgoing shipment. As noted above, traditional systems may leave it up to the operations personnel 218 to identify the sortable and non-sortable containers by viewing printed labels on the temporary storage locations 206. This process may be time consuming and challenging, and may lead to missed items that are not located prior to the outgoing shipments.

Embodiments of the present disclosure illustrate the location and storage system that includes the master controller 326 communicating with the temporary storage locations 206 throughout the logistics facility 202. For example, storage controllers 402A, 402B, 402C may be associated with particular temporary storage locations, such as the non-sortable container 208A, sortable container 210A, and sortable container 210B, respectively. As such, an upcoming CPT may include various items and their locations may be identified. Then, an instruction or command may be transmitted to the storage controllers 402A, 402B, 402C to identify the temporary storage locations 206, such as by using the indicators 422, 424. In various embodiments, the indicators 422, 424 may be lights, as noted above, which may illuminate to provide a beacon for the operations personnel 218 to quickly identify the appropriate temporary storage locations 206. In various embodiments, the indicators 422, 424 may be personalized for given operations personnel 218. For example, the temporary storage locations 206 associated with operations personnel 218A may have blue lights while temporary storage locations 206 associated with operations personnel 218B may have green lights. In this manner, the operations personnel 218 can look through the logistics center 202 and identify the associated temporary storage locations 206 from a distance, without searching throughout the whole logistics center 202.

By way of example, operations personnel 218A may be assigned an item located at the sortable container 210A. Due to the distance of operations personnel 218A from the sortable container 210A, compared to the proximity to the first area 212, the operations personnel 218A may begin searching through the first area 212, which wastes time, because the sortable container 210A is in the third area 216. However, utilizing the storage controller 402B, the operations personnel 218A can quickly scan the first area 212, not see any indication, and then move on to look in other areas. As a result, the operations personnel 218A may no longer individually check labels on the temporary storage locations 206, but rather, look for indicators from the storage controllers 402 for associated items.

It should be appreciated that, in various items, additional identification methods may also be utilized. For example, an audible sound may guide the operations personnel 218 to the appropriate temporary storage location 206. Additionally, a user device of the operations personnel 218 may provide location information, such as the appropriate area to a map to the temporary storage location 206. For example, in embodiments, BLUETOOTH® may be utilized to identification a location of the temporary storage location 206 within the facility. As such, it should be appreciated that a variety of different options may be provided in order to facilitate identification of the temporary storage locations 206 associated with particular items.

Figure 6A:
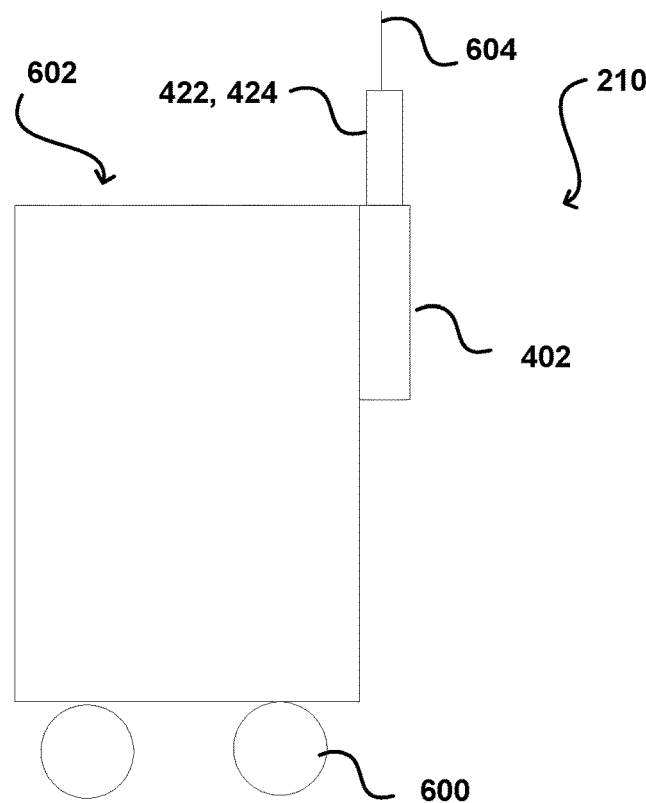
FIGS. 6A and 6B illustrate schematic diagram of example storage controllers at temporary storage locations, in accordance with aspects of the present disclosure.
Figure 6B:
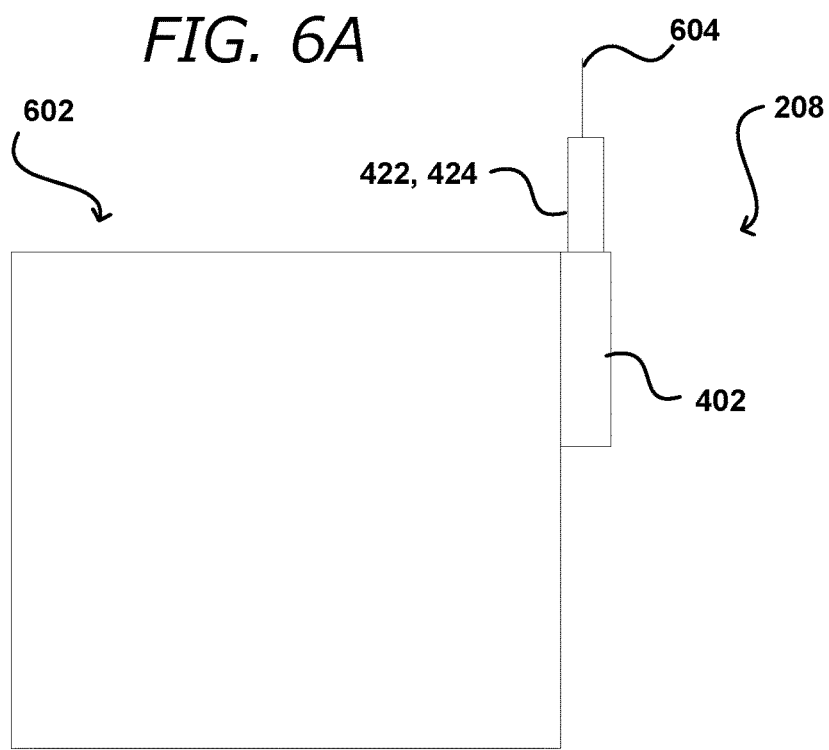

FIGS. 6A and 6B are schematic diagrams of embodiments of the sortable container 210 and non-sortable container 208 including the storage controller 402. As noted above, the sortable container 210 may be mobile and includes the wheels 600 that facilitate transportation throughout the logistics center 202. For example, the sortable container 210 may be used during the picking process and as items are selected from inventory 204, they may be scanned and positioned on the sortable container 210. In contrast, the non-sortable container 208 does not include the wheels and may be stationary.

In various embodiments, the storage controller 402 may be mounted to a structural feature of the respective non-sortable container 208 and/or sortable container 210. The illustrated storage controllers 402 are positioned toward tops 602 of the non-sortable container 208 and the sortable container 210, thereby providing improved visibility. For example, arranging the storage controller 402, and associated indicators 422, 424 and/or antenna 604 lower to the ground may reduce visibility and also reduce receipt of signals. In various embodiments, different components of the storage controllers 402 may be positioned at different locations and may be communicatively coupled to other components, such as the MCU 404. For example, the scanner 410 may be positioned proximate a surface of the sortable container 210 such that the item is scanned as it is positioned on the surface. This positioning may be ergonomic, as opposed to placing the scanner high and causing operations personnel to lift items for scanning.

Figure 7:
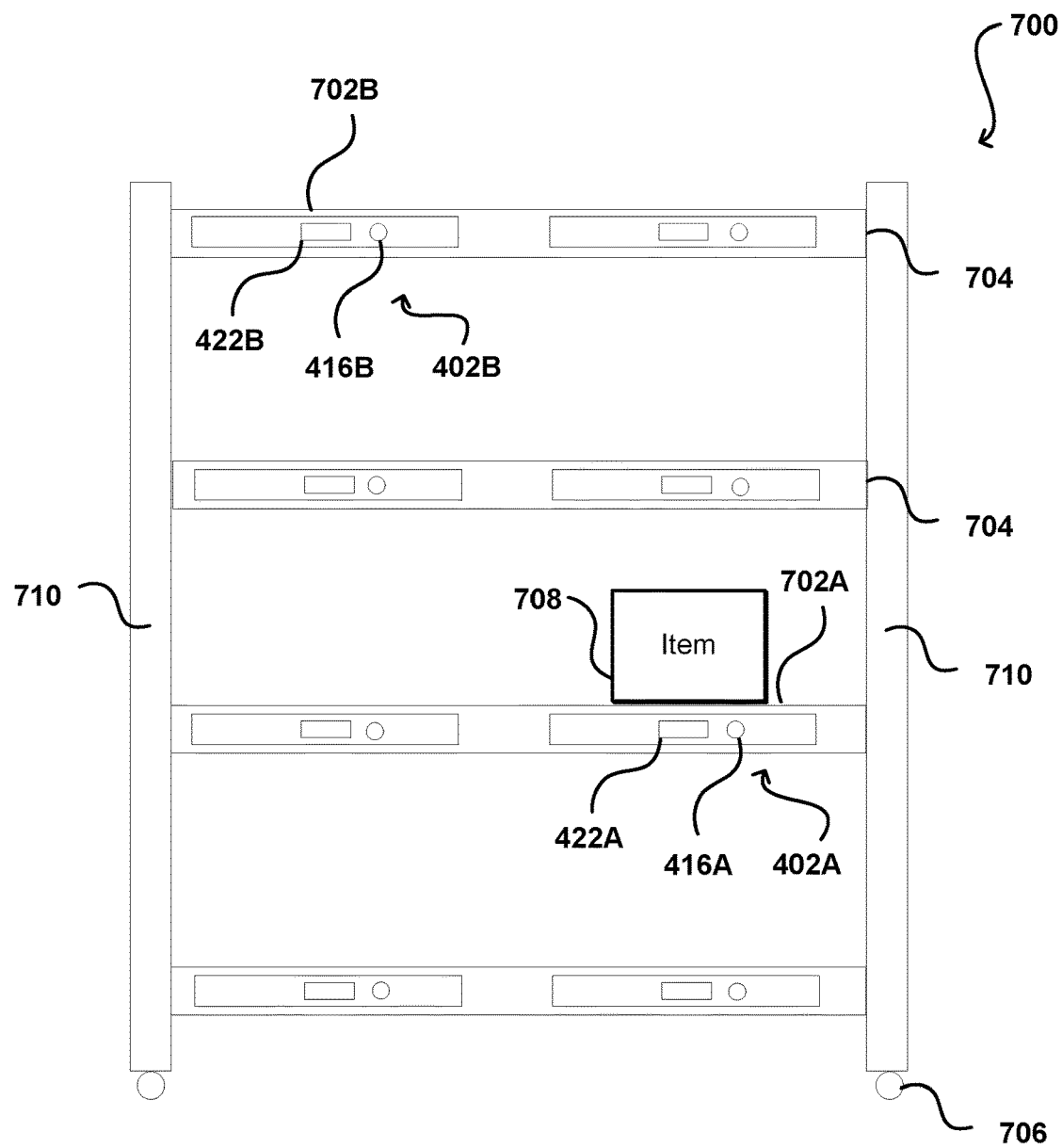
FIG. 7 illustrates a schematic diagram of example storage controllers at a temporary storage location, in accordance with aspects of the present disclosure.

FIG. 7 is a schematic diagram of an embodiment of a storage rack 700, which may, in various embodiments, be used as a temporary storage location 206. The storage rack 700 may receive one or more items. In various embodiments, the items may be designated for placement at particular locations, for example, at a first location 702A or a second location 702B, which may as associated with different shelves 704 of the rack 700 or with different positions on the same shelf 704. These locations 702A, 702B, among others, include the storage controller 402, or at least components thereof, that include at least the visual indicator 422, in the illustrated embodiment. However, it should be appreciated that, in other embodiments, additional components such as the auxiliary indicator 424, button 420, touch sensor 418, and the like may also be included, but have been removed from the illustrated embodiment for clarity. Furthermore, while embodiments of the present disclosure include the storage controllers 402 arranged along the shelves 704, it should be appreciated that the indicators and/or controllers may be positioned at any location on the shelf, such as along the vertical posts.

In operation, operations personnel may arrange items on the various shelves 704 of the storage rack 700, for temporary or long-term storage. The illustrated storage rack 700 includes wheels 706 to facilitate movement of the storage rack 700. Accordingly, in various embodiments, the storage controllers 402 of the storage rack 700 may include a mobile power source, such as the power supply 414, to facilitate free movement of the storage rack 700 (e.g., not plugging in the storage rack). As the operations personnel select an item, for example from a bin or the like, the item may be scanned. Information from the scanned item may be transmitted to the main gateway 334, for example via the master controller 326, and the main gateway 334 may transmit an instruction to one of the storage controllers 402 associated with a particular location 702 where the item is to be stored. For example, the instruction may illuminate the visual indicator 422, which may be LED lights, and provide an indication for where the operations personnel may position the item. In various embodiments, the proximity sensor 416 may detect the item be placed at the location 702, which may provide a signal to turn off the visual indicator 422. In this manner, operations personnel may be directed to position items at particular locations.

It should be appreciated that, in various embodiments, features of the storage rack 700 may also be integrated into the sortable containers 210 or the non-sortable containers 208. For example, particular locations of sortable containers 210 or non-sortable containers 208 may include indicators that direct operations personnel to arrange items at certain locations, which may simplify later operations that include locating the item.

In certain embodiments, operations personnel may be in close proximity to the storage rack 700 when scanning and positioning items. As a result, latency is undesirable, as the operations personnel may not want to stand and wait for the indication of where to position the item. As noted above, while providing latency, such as sleep timers and the like, may improve power consumption, it may be undesirable where operations personnel will be in close proximity. Accordingly, in various embodiments, operations may be conducted in a broadcast mode, as opposed to unicast mode, to reduce latency. For example, each "hop" or transmission may include some latency, such as approximately 30 to 50 ms. However, operations in broadcast mode may enable latency of between 20 and 30 ms, with the tradeoff being additional power consumption.

By way of example, an operations personnel may identify an item 708 for placement on the storage rack 700. The operations personnel may scan the item 708, for example via a handheld device. Information about the scan may be transmitted to at least one of the master controller 326, main gateway 334, or storage controller 402A. For example, the master controller 326 may receive information indicative of an identity of the item 708, determine the location 702A for receiving the item, and transmit an instruction to the main gateway 334. The main gateway 334 may transmit the instruction to the storage controller 402A associated with the location 702A and provide an indication, such as illuminating LEDs forming the visual indicator 422A. The operation personnel may then position the item 708 at the first location 702A. Upon positioning the item, the proximity sensor 416A may detect the item and transmit an instruction to turn off the visual indicator 422A. Furthermore, in embodiments, additional instructions may also be provided on the visual indicator 422A. In this manner, the item 708 may only be scanned a single time, to identify the proper location, and not scanned after positioning the item on the shelf 700. Additionally, a second scan corresponding to the location 702A is unnecessary because the location 702A has also been tied to the item 708 via the storage controller 402A.

The configuration of the storage rack 700 of FIG. 7 is for illustrative purposes only and may include other items. For example, rather than having two posts 710, there may also be additional posts 710, such as one arranged at a central location of the storage rack 700. Moreover, the storage controllers 402 may be arranged on the posts 710, rather than or in addition to the shelves 704. Accordingly, a variety of different configurations may enable the sensing of items being arranged on the storage rack 700.

Figure 8:
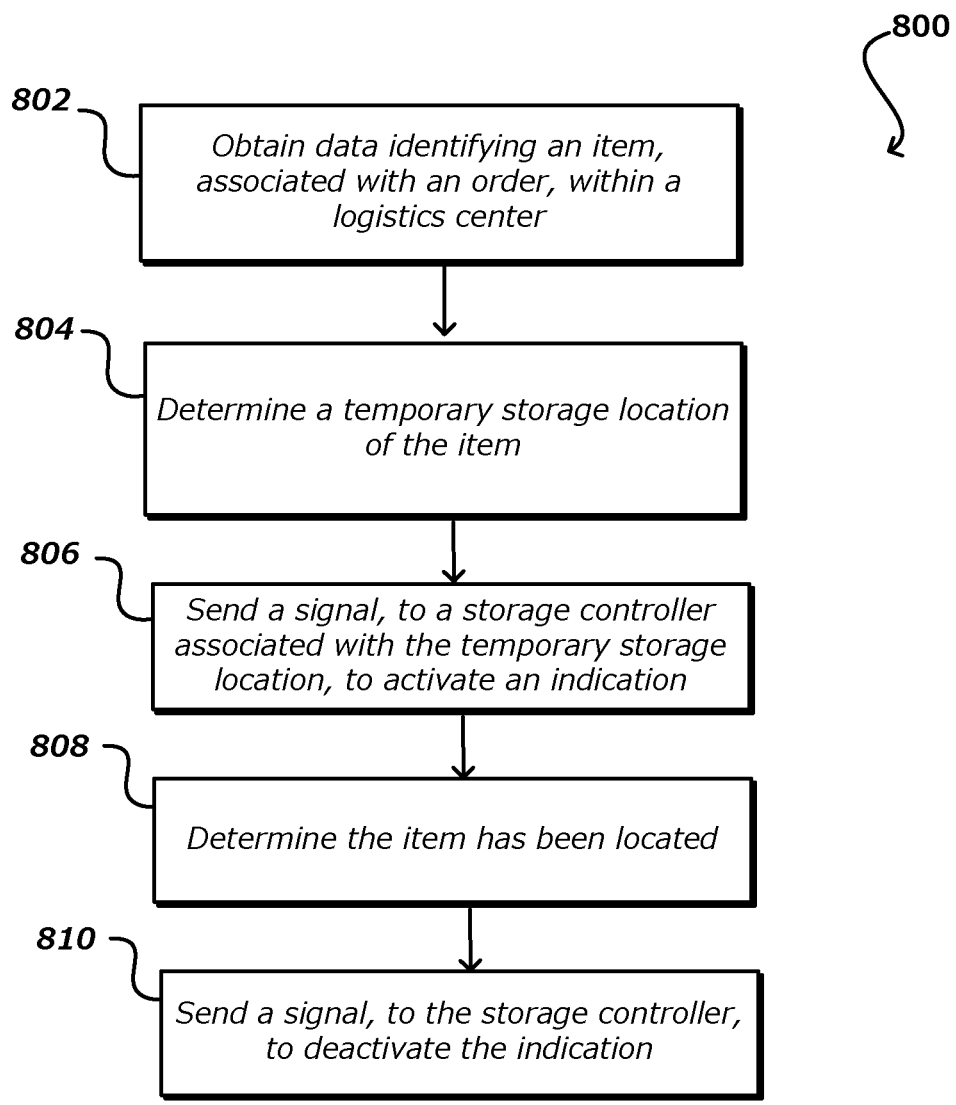
FIG. 8 illustrates an example process for providing an indication for an item location, in accordance with various embodiments of the present disclosure.

FIG. 8 illustrates an example method embodiment 800 for identifying items and their associated temporary storage locations. It should be understood that there can be additional, fewer, or alternative steps performed in similar or alternative orders, or in parallel, within the scope of the various embodiments unless otherwise stated. The example begins by obtaining data identifying an item 802. The item may be associated with a customer order, for example made through an online marketplace and then transmitted to a logistics center. The logistics center may receive and fill the order, which includes the item, for shipment to the customer. Because logistics centers may be large and carry thousands of items in inventory, items may be selected, or picked, from shelves and then arranged within temporary storage locations, such as sortable or non-sortable containers. The method may determine a particular temporary storage location for the item 804. For example, as items are picked they may be scanned and associated with a particular temporary storage location. This information may be stored, for example via a cloud system, managing inventory and shipment for the fulfillment center, to track locations of items and their upcoming shipment times, among other information about the item and/or order including the item.

In embodiments, a signal is transmitted to a storage controller, associated with the temporary storage location, to activate an indication 806. For example, in embodiments, the information regarding the item may be pushed or retrieved to a master controller that monitors operations within the logistics center. The information may include an upcoming outgoing shipment that is scheduled to include the item. As a result, it may be desirable to obtain the item from the temporary storage location for inclusion with the upcoming outgoing shipment. In embodiments, the master controller may also communicate with a main gateway, which may distribute information to the individual storage controllers. In operation, there may be hundreds or thousands of different temporary storage locations within the logistics center. The signal to provide the indication may include a signal to illuminate a light, which may be coupled to the temporary storage location, to emit a sound, to provide directions on a user device of an operations personnel, or the like. The indication may guide the operations personnel toward the temporary storage location, where the item can be located. In embodiments, it is determined that the item has been located and/or processed 808. In various embodiments, locating and/or processing the steps may include an operator obtaining and scanning the item, the item being scanned during a subsequent process, such as a sorting process, the item going out for shipment, or the like. Accordingly, a variety of different tasks may be utilized to trigger or inform the system that the item has been located. This process may be referred to as progression of the item because subsequent steps may vary for different items. For example, upon locating and obtaining the item, the operations personnel may scan the item, activate a button, trigger a proximity sensor, or the like. The subsequent progression may therefore direct the item to packaging, sorting, other processing steps, or the like. This information may be transmitted back to the master controller and/or the main gateway, which may transmit a signal back to the storage controller to deactivate the indication 810. For example, the light may turn off or the sound may cease. It should be appreciated that, in various embodiments, the signal to remove the indication may also come from the storage controller. By way of example only, the storage controller may receive a signal, such as from a button, that the item has been selected. Thereafter, the storage controller may deactivate the signal and also transmit information back to the master controller and/or the main gateway. In this manner, particular items may be identified at various temporary storage locations throughout a logistics center.

In various embodiments, a sortable or non-sortable container may include multiple items that have been designated for location. As a result, locating one of the items may be insufficient to deactivate the indication. Accordingly, in various embodiments, deactivation may be delayed until each item located at the sortable or non-sortable container has been located and/or processed, as described above. In other words, the indication may remain active until the task, which may include identifying and scanning or processing the item, is complete for the entire temporary storage container, rather than only an individual item.

Figure 9:
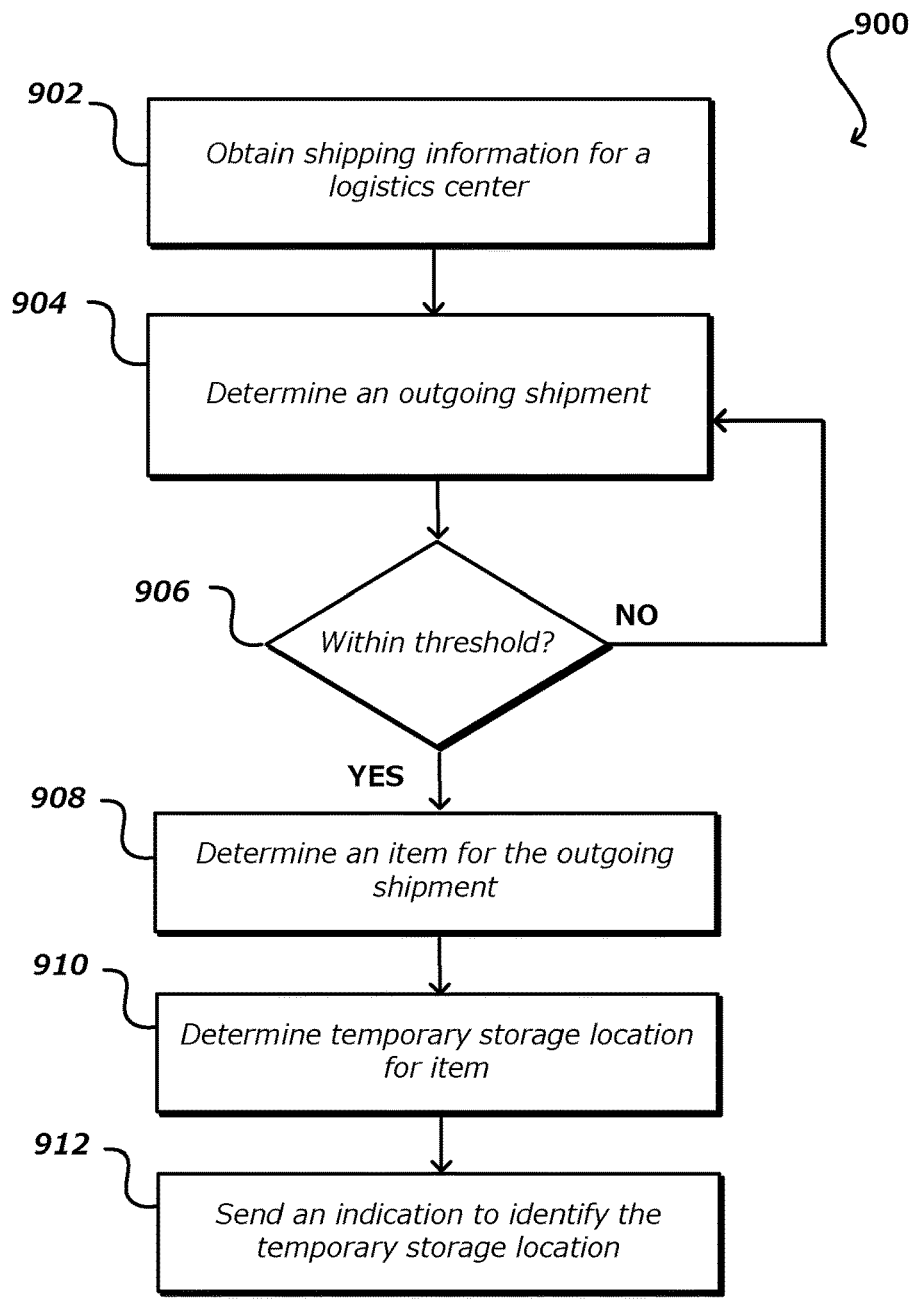
FIG. 9 illustrates an example process for identifying items for shipment within a threshold period of time, in accordance with various embodiments of the present disclosure.

FIG. 9 illustrates an example method 900 for selecting items within a logistics center. The example begins with obtaining shipping information for a logistics center 902. For example, data may be retrieved or streamed to a master controller. The data may include upcoming outgoing orders, upcoming shipment times, incoming shipments, and the like. In various embodiments, the shipping information may include a list of upcoming shipment times and various orders, which may include items purchased by customers, associated with those upcoming shipment times.

In various embodiments, an outgoing shipment is selected 904. For example, the next outgoing shipment may be selected, based on the current time when the information is retrieved. Additionally, an upcoming shipment several hours later may be determined. Furthermore, in embodiments, one or more upcoming shipments may be identified. For example, control logic or the like may be utilized to select a predetermined amount of upcoming shipments or a number of shipment within a predetermined threshold of time. By way of example, the threshold may be the next three shipments, the shipments within the next 2 hours, or the like. The established threshold may be evaluated 906, and outgoing shipments satisfying the threshold may be processed. In various embodiments, items identified as being associated with upcoming shipments may be determined 908. For example, the upcoming shipments may include a variety of customer orders, which each include items. A particular item may be selected. As noted above, this may be an item with a critical pull time (CPT) due to the time until the outgoing shipment to position the item onto the outgoing shipment. As a result, an item with the CPT may be a high priority item.

In embodiments, logistics centers may include hundreds or thousands of different items and, moreover, include hundreds or thousands of different storage locations for those items. In certain embodiments, items are selected from inventory and arranged in temporary storage locations prior to shipment. Items with an upcoming CPT may be arranged in these temporary storage locations and the temporary storage locations may be identified 910. For example, in various embodiments, the temporary storage locations may be equipped with storage controllers that may send or receive information, such as instructions to activate an indicator. Instructions may be transmitted to the temporary storage location that includes the item 912, which enables operations personnel to quickly identify the temporary storage location and obtain the item. It is desirable to obtain the item prior to the departure of the outgoing shipment to maintain customer satisfaction. Accordingly, in various embodiments, the instructions may be transmitted at least a certain period of time prior to the departure of the outgoing shipment to provide time to obtain and prepare the item for shipment.

Figure 10:
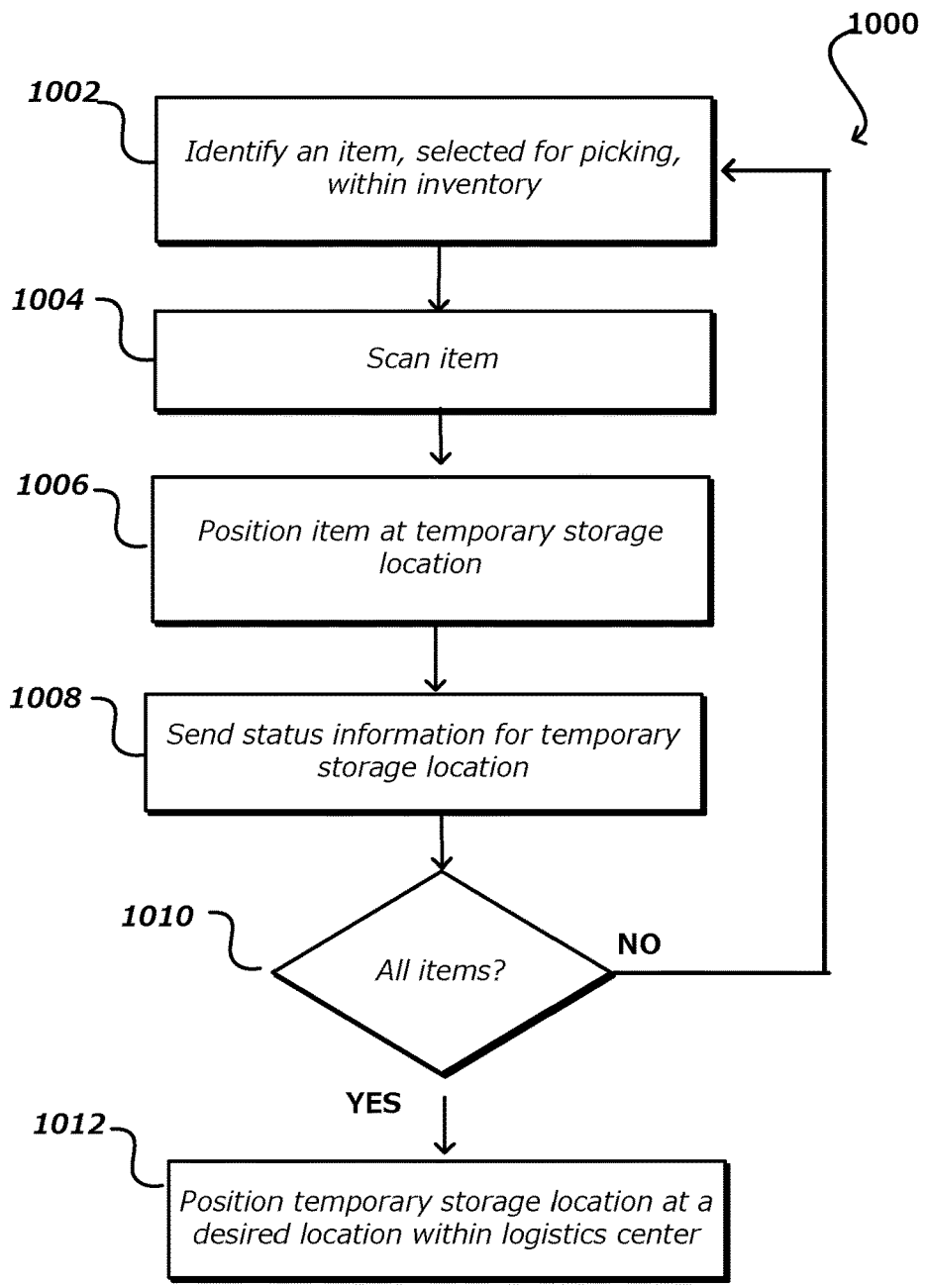
FIG. 10 illustrates an example process for selecting and storing items, in accordance with various embodiments of the present disclosure.

FIG. 10 illustrates an example method 1000 for selecting items for temporary storage within a logistics center. The example begins with identifying an item, selected for picking, within inventory 1002. For example, operations personnel may be provided with a list of items, which may be received from customer orders. The items may be identified within inventory and scanned 1004. In various embodiments, the items are scanned using a handheld device. In certain embodiments, the scanner is integrated into a temporary storage location, such as sortable or non-sortable container. As a result, the process of selecting and scanning may be essentially "hand free" in that the operations personnel is not carrying a device to do the scanning, but rather, scans the items as the item is selected and stored. The item is arranged at the temporary storage location 1006, such as being placed on the cart or within the non-sortable container. Information regarding the placement of the item is then transmitted 1008. For example, the information may include a status of the list, a full temporary storage location, the item location, or the like. Operations personnel may evaluate their list to determine if all items have been picked 1010. If not, then additional items are identified and scanned. If so, the temporary storage location is then positioned at a desired location 1012. In various embodiments, the temporary storage location may have a predetermined position. Accordingly, embodiments of the present disclosure enable quick picking and identification of an item location after picking.

Figure 11:
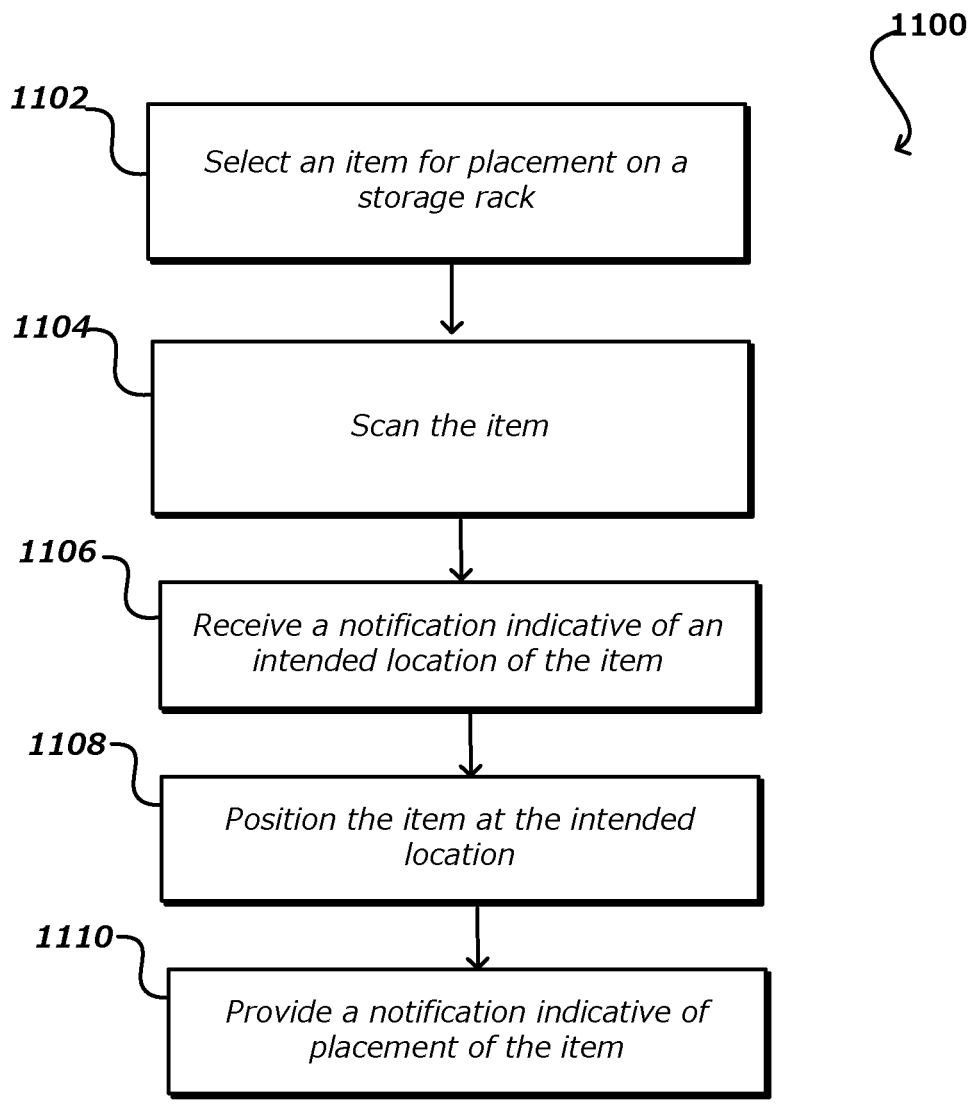
FIG. 11 illustrates an example process for identifying an intended location for an item, in accordance with embodiments of the present disclosure.

FIG. 11 illustrates an example method 1100 of positioning an item on a storage rack. This example begins by selecting an item for placement on the storage rack 1102. For example, the item may be selected from a cart or list of items. The item is scanned 1104. Scanning the item may transmit information, for example to a master controller or main gateway, providing information regarding the item and a desired location. A notification is received indicating an intended location for the item 1106. For example, the storage rack may include one or more storage controllers that include indications, such as lights or sounds, to direct placement of the items. The notification may be transmitted after the information from the scan is received. The item is positioned at the intended location 1108. Then, a notification indicative of a placed item is transmitted 1110. For example, the notification may include activation of a sensor, scanning of the item by the operations personnel, or the like. In one example, a proximity sensor or button may be arranged proximate the intended location. As the item is positioned at the intended location, the sensor or button may transmit a signal indicating placement of the item, which may deactivate the notification, such as turning off notification lights.

Figure 12:
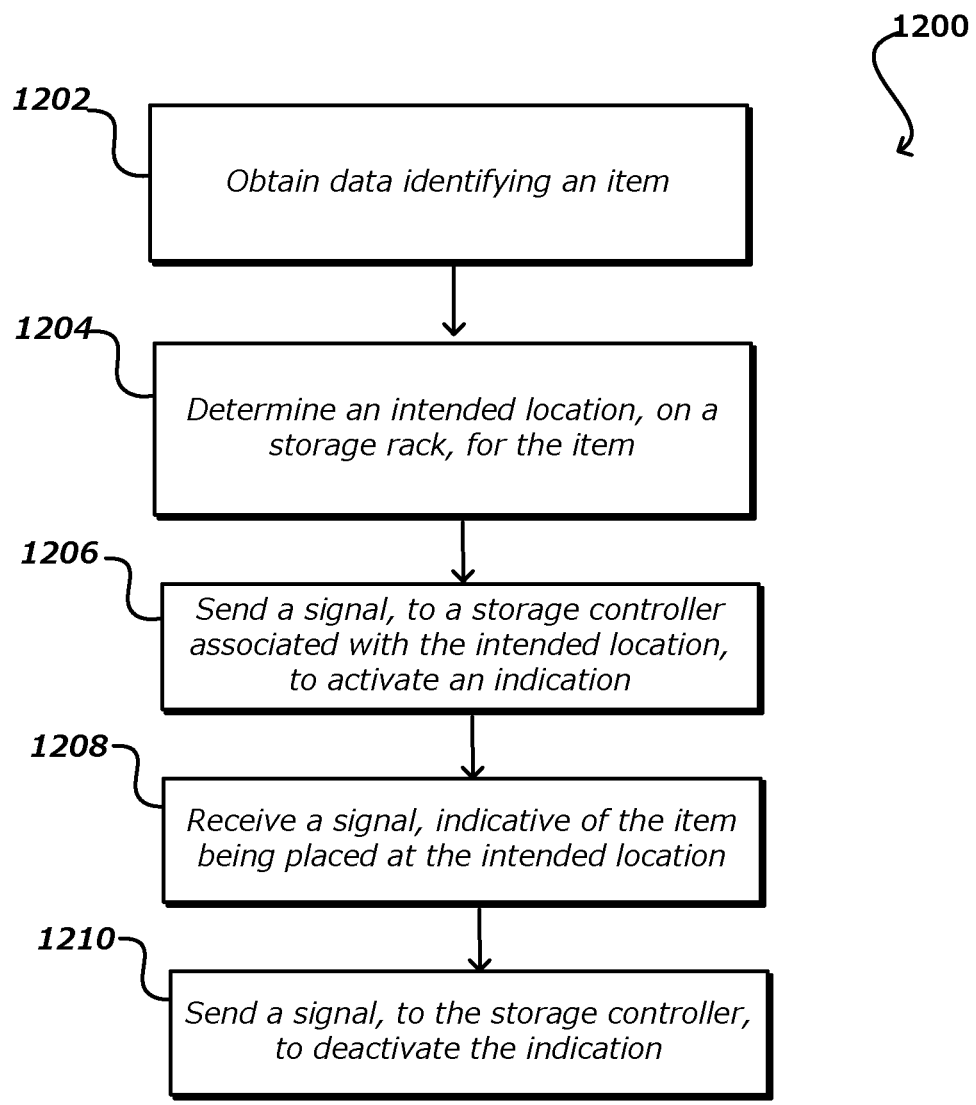
FIG. 12 illustrates an example process for identifying an intended location for an item, in accordance with embodiments of the present disclosure.

FIG. 12 illustrates an example method 1200 for providing an indication for arranging at item on a storage rack. This example begins by obtaining data identifying an item 1202. For example, in various embodiments, an item may be scanned, such as with a barcode scanner, and information may be transmitted to a main gateway or master controller, as described above. Based on the information indicative of the item, an intended location for the item is determined 1204. For example, the intended location may be based on a size of the item, a likelihood the item will soon be retrieved, and the like. A signal is transmitted to activate an indication for the intended location 1206. In various embodiments, the storage rack may include storage controllers that include indicators, such as lights. The storage controller may receive the signal and provide an indication. Once the item is positioned on the storage rack, a signal indicative of the positioned item is received 1208. For example, a button may be pressed or a proximity sensor may determine the item is arranged at the intended location. As a result, a signal may be send to deactivate the indication 1210. The signal may have the lights stop illuminating, for example, and another item may be prepared for storage on the rack.

Figure 13:
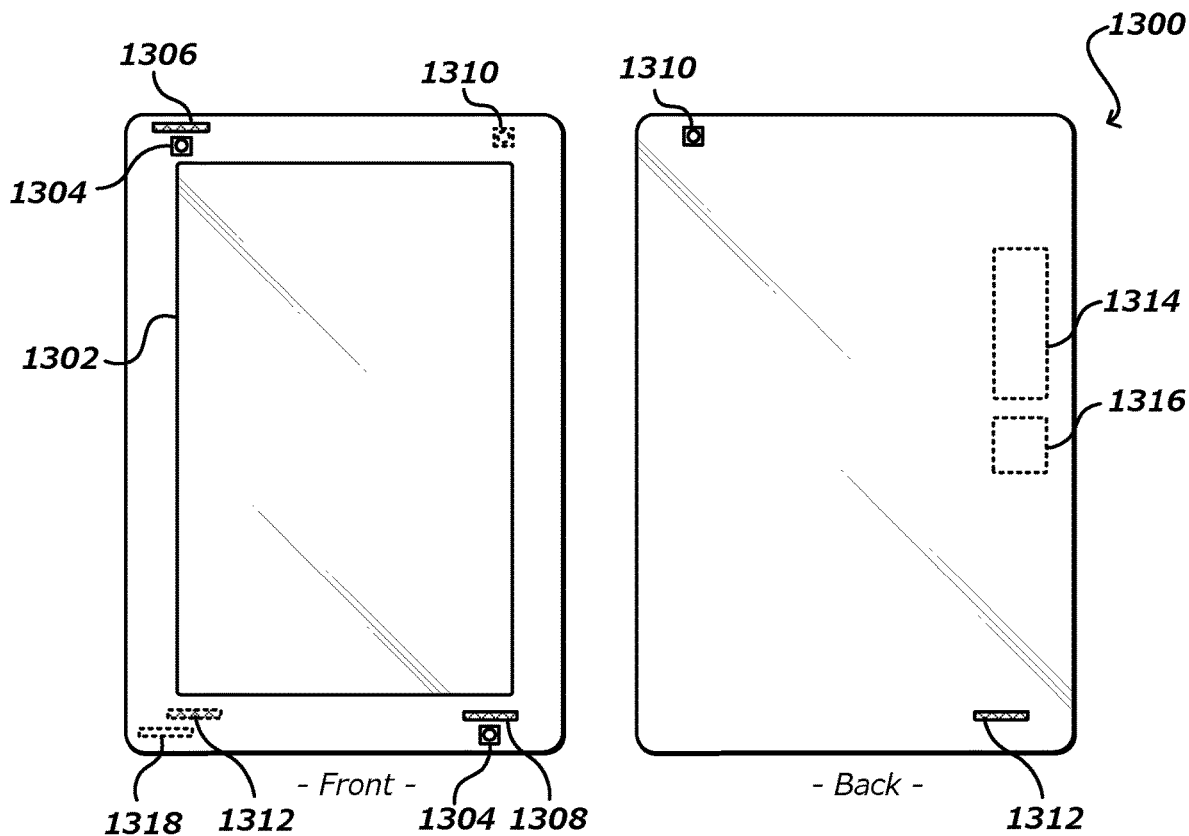
FIG. 13 illustrates an example device that can be used to implement aspects of the various embodiments.

FIG. 13 illustrates front and back views of an example electronic computing device 1300 that can be used in accordance with various embodiments, such as by operations personnel to scan items or to receive instructions. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1300 has a display screen 1302 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1304 on the front of the device and at least one image capture element 1310 on the back of the device. It should be understood, however, that image capture elements could also, or alternatively, be placed on the sides or corners of the device, and that there can be any appropriate number of capture elements of similar or different types. Each image capture element 1304 and 1310 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1308 on the front side, one microphone 1312 on the back, and one microphone 1306 on or near a top or side of the device. In some devices there may be only one microphone, while in other devices there might be at least one microphone on each side and/or corner of the device, or in other appropriate locations.

The device 1300 in this example also includes one or more orientation- or position-determining elements 1318 operable to provide information such as a position, direction, motion, or orientation of the device. These elements can include, for example, accelerometers, inertial sensors, electronic gyroscopes, and electronic compasses.

The example device also includes at least one communication mechanism 1314, such as may include at least one wired or wireless component operable to communicate with one or more electronic devices. The device also includes a power system 1316, such as may include a battery operable to be recharged through conventional plug-in approaches, or through other approaches such as capacitive charging through proximity with a power mat or other such device. Various other elements and/or combinations are possible as well within the scope of various embodiments.

Figure 14:
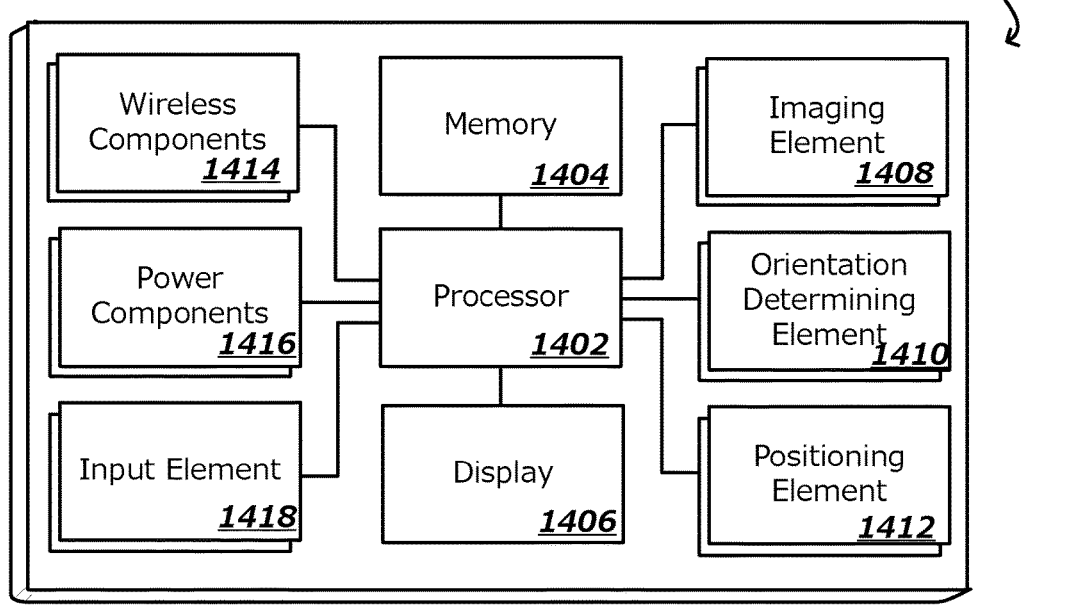
FIG. 14 illustrates example components of a client device such as that illustrated in FIG. 13.

FIG. 14 illustrates a set of basic components of an electronic computing device 1400 such as the device 1400 described with respect to FIG. 13. In this example, the device includes at least one processing unit 1402 for executing instructions that can be stored in a memory device or element 1404. As would be apparent to one of ordinary skill in the art, the device can include many types of memory, data storage, or computer-readable media, such as a first data storage for program instructions for execution by the processing unit(s) 1402, the same or separate storage can be used for images or data, a removable memory can be available for sharing information with other devices, and any number of communication approaches can be available for sharing with other devices.

The device typically will include some type of display element 1406, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1408, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1400 also includes at least one orientation determining element 1410 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1400. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1412 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 1414 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1416, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1418 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 15:
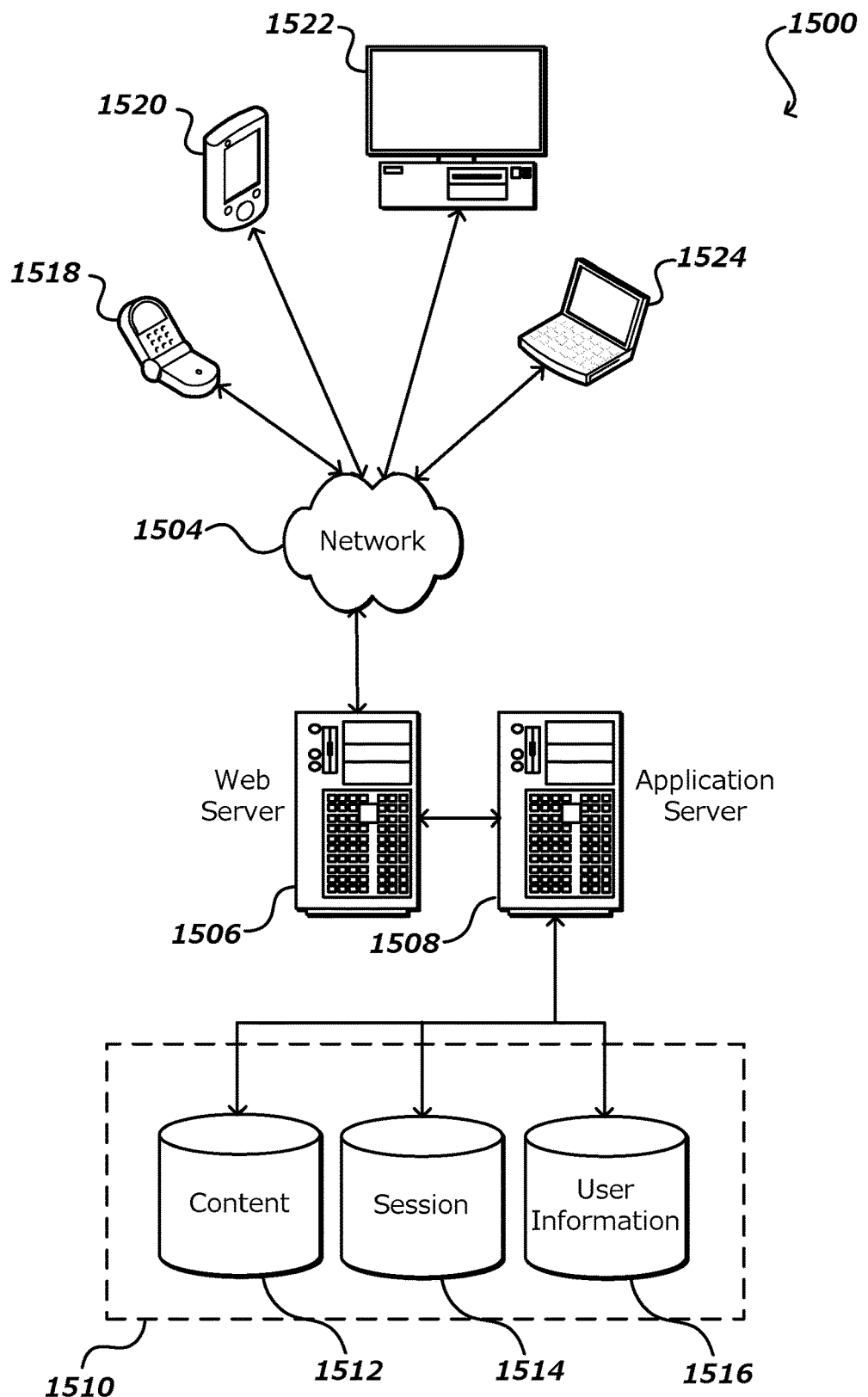
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes electronic client devices 1518, 1520, 1522, and 1524, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client devices 1518, 1520, 1522, and 1524 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1518, 1520, 1522 and 1524. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for identifying and locating an item within a logistics center, comprising:
   obtaining, from a shipment database associated with a logistics center environment and responsive to an inquiry, shipment data including at least an upcoming outgoing shipment, the shipment data including an order having an item that at least partially fulfills the order;
   determining, by a main gateway for the logistics center, a current location of the item, the current location being within the logistics center, the item having been picked from inventory and arranged at the current location;
   sending, by the main gateway, a first signal, to a storage controller associated with the current location, identifying the item is associated with the upcoming outgoing shipment, the first signal including at least instructions to activate an indicator of the storage controller, the indicator providing a notification associated with the current location; and
   receiving, responsive to selection and removal of the item from the current location, a second signal, the second signal indicating progression of the item from the current location to an updated location, the second signal deactivating the indicator of the storage controller.

2. The method of claim 1, further comprising:
   determining a current time;

determining a shipment time for the upcoming outgoing shipment; and determining a difference between the current time and the shipment time is within a threshold period of time.

3. The method of claim 1, wherein the first and second signal are sent over a sub-GHz band.

4. The method of claim 1, wherein the indicator includes at least one of a visual indication, an auditory indication, or a haptic indication.

5. A method for identifying an item within a logistics center, comprising:

obtaining, by a main gateway, location information for an item, the location information being updated responsive to the item being transitioned from an initial position to a temporary storage location, and the location information including at least an item identifier, an order associated with the item, and the temporary storage location of the item;

receiving a request to locate the item; and sending, from the main gateway responsive to the request, an instruction to a storage controller positioned at the temporary storage location, to activate an indicator, the indicator directing a user to the temporary location.

6. The method of claim 5, further comprising:

receiving a signal indicating progression of the item from the temporary storage location; and sending a second instruction, to the storage controller, to deactivate the indicator.

7. The method of claim 6, wherein the signal is transmitted via an interaction with at least one of a button, a proximity sensor, a touch sensor, or a scanner.

8. The method of claim 5, further comprising:

receiving shipment information for a plurality of outgoing shipments, the shipment information including a plurality of items for inclusion with an outgoing shipment of the plurality of shipments, wherein the item is one of the plurality of items;

identifying respective temporary storage locations for the plurality of items; and prioritizing items of the plurality of items based on shipping times for the plurality of outgoing shipments.

9. The method of claim 5, further comprising:

sending a monitoring signal to the storage controller;

receiving a health signal, including at least health information, for the storage controller, wherein the health information includes at least one of a battery life, a firmware version, or an error message.

10. The method of claim 5, wherein the instruction is sent over a sub-GHz band.

11. The method of claim 5, further comprising:

retrieving the item from inventory;

scanning the item, wherein scanning the item associates the item with the temporary storage location; and positioning the item at the temporary storage location.

12. The method of claim 5, wherein the temporary storage location is at least one of a fixed location or a movable location.

13. The method of claim 5, further comprising:

sending, to a user device, a location update, the location update providing a relative position of the temporary storage relative to the user device.

14. The system of claim 5, wherein the instruction is transmitted in a broadcast mode of operation to reduce latency.

15. The method of claim 5, wherein the indication includes at least one of a visual indication, an auditory indication, or a haptic indication.

16. A system, comprising:

at least one processor; and memory including instructions that, when executed by the at least one processor, cause the system to:

obtain, by a main gateway, location information for an item, the location information being updated responsive to the item being transitioned from an initial position to a temporary storage location, and the location information including at least an item identifier, an order associated with the item, and the temporary storage location of the item;

receive a request to locate the item; and send, from the main gateway responsive to the request, an instruction to a storage controller positioned at the temporary storage location, to activate an indicator, the indicator directing a user to the temporary location.

17. The system of claim 16, wherein the instructions when executed further cause the system to:

receive a signal indicating the item has been located; and send a second instruction, to the storage controller, to deactivate the indicator.

18. The system of claim 16, wherein the instructions when executed further cause the system to:

retrieve the item from inventory;

scan the item, wherein scanning the item associates the item with the temporary storage location; and position the item at the temporary storage location.

19. The system of claim 16, wherein the instructions, when executed further cause the system to:

receive shipment information for a plurality of outgoing shipments, the shipment information including a plurality of items for inclusion with an outgoing shipment of the plurality of shipments, wherein the item is one of the plurality of items;

identify respective temporary storage locations for the plurality of items; and prioritize items of the plurality of items based on shipping times for the plurality of outgoing shipments.

20. The system of claim 16, wherein the instructions, when executed further cause the system to:

send a monitoring signal to the storage controller;

receive a health signal, including at least health information, for the storage controller, wherein the health information includes at least one of a battery life, a firmware version, or an error message.

* * * * *